United States Patent [19]

Farhadiroushan

[11] Patent Number: 5,754,293
[45] Date of Patent: May 19, 1998

[54] APPARATUS FOR THE SIMULTANEOUS ACQUISITION OF HIGH BANDWIDTH INFORMATION IN VERY LONG ARRAYS CONTAINING LARGE NUMBERS OF SENSOR ELEMENTS

[75] Inventor: Mahmoud Farhadiroushan, London, United Kingdom

[73] Assignee: Sensor Dynamics Limited, Hamspire, United Kingdom

[21] Appl. No.: 779,216

[22] Filed: Jan. 6, 1997

Related U.S. Application Data

[63] Continuation of Ser. No. 692,878, Aug. 1, 1996, abandoned, which is a continuation of Ser. No. 339,965, Nov. 15, 1994, abandoned.

[30] Foreign Application Priority Data

Nov. 26, 1993 [GB] United Kingdom ............... 9324333

[51] Int. Cl.$^6$ ............................................. G01B 9/02
[52] U.S. Cl. ............................... 356/345; 356/352
[58] Field of Search ................................ 356/345, 352, 356/35.5

[56] References Cited

U.S. PATENT DOCUMENTS 5,361,130  11/1994  Kersey et al. ........................ 356/345

OTHER PUBLICATIONS

W.W. Morey, "Distributed Fiber Grating Sensors", Dec. 1990, pp. 285–288, United Technologies Research Center.

*Primary Examiner*—Frank G. Font
*Assistant Examiner*—Robert Kim
*Attorney, Agent, or Firm*—Iandiorio & Teska

[57] ABSTRACT

Apparatus comprising a source (1) of electromagnetic radiation; a sensing network (5) which comprises a plurality of sensing interferometers (10) each of which includes a wavelength filter for selecting a band of wavelengths (11) of electromagnetic radiation provided by the source (1) and is suitable for converting the magnitude of one or more physical parameters to a change in a sensor optical path length delay; a reference interferometer (7) for selecting a reference optical path delay; a wavelength selection device (8) for selecting one or more of the band of wavelengths (11) filtered by one or more of the sensing interferometers (10); and a detector (9) for converting the electromagnetic radiation selected by the wavelength selection device (8) to an electrical signal.

9 Claims, 6 Drawing Sheets

APPARATUS FOR THE SIMULTANEOUS ACQUISITION OF HIGH BANDWIDTH INFORMATION IN VERY LONG ARRAYS CONTAINING LARGE NUMBERS OF SENSOR ELEMENTS

This is a continuation of application Ser. No. 08/692,878, filed Aug. 1, 1996 (now abandoned), which is a continuation of application Ser. No. 08/339,965, filed Nov. 15, 1994 (now abandoned).

The invention relates to an apparatus for the measurement of physical parameters and relates particularly to a distributed array of optical fibre sensors.

In recent years, a large number of optical fibre sensors suitable for the measurement of a wide range of physical and environmental parameters have been developed, where the particular advantages of the high sensitivity and the small dimensions of optical fibre sensors have been exploited. In addition, a number of different multiplexing schemes using optical fibres to communicate between the optical fibre sensors and the measurement instrumentation have been developed which simplify the measurement of a number of parameters over a distributed region. In the fields of seismic imaging and subsea oil and gas pipeline leak detection monitoring, there is a demand for distributed sensors for the measurement of acoustic energy, where there are particularly difficult requirements for high sensitivity, high spatial resolution and wide band frequency response. Distributed and multiplexed optical fibre sensor measurement systems are particularly attractive as they promise to meet these technical requirements but are also relatively low cost, both to manufacture and to deploy.

It is desirable to produce fibre optic sensor networks in which a large number of sensors are situated in one- or two-dimensional arrays. In some applications, such as phased-array sonar systems a linear acoustic sensor array of length between 100 metres and 50 kilometres may be desired. Also, in some cases, for example to detect acoustic noise from leaking pipes, or to achieve high directionality for sonar systems, it may be desired to design sensors for detection of high acoustic frequencies up to 100 kHz or even greater. For pipelines, the distances involved can be as high as 200 km and there is a clear economic need to increase the number of sensors per array and thus to decrease the numbers of arrays deployed. Optical fibre sensors can provide excellent detection behaviour at these high frequencies. However, existing methods of interrogating arrays of sensor systems are not well suited to perform real-time, simultaneous, interrogation of long linear arrays over a single fibre lead, particularly at high detection frequencies.

For example, the well-known time-division multiplexed arrays involve launching pulses of light into a sensing network, and observing phase modulation of the returning light pulses. However, the finite time for signals to return from a long array make it difficult to detect high acoustic frequencies. Wavelength-multiplexed arrays using scanned laser sources can only interrogate sensors on a sequential basis and are therefore unsuitable for real-time sensing from an array unless the frequency of acoustic detection is very low, allowing sampling of signals at twice the acoustic frequency, or greater, in order to satisfy the well-known Nyquist sampling criterion. Use of multiple optical sources, each being modulated, and each being of different wavelength, is, of course, possible, but represents an expensive option for large arrays.

The object of the current invention is a multiplexed system which uses the technique of "Spectral slicing" of the energy emitted by a broadband source to divide the available energy into a number of separate spectral regions, each spectral region being used for interrogation of a separate interferometric sensor element. Thus in one implementation each interferometer in the array contains a narrow band optical filter to define a narrow spectral band for each sensor interferometric element. This filter acts in combination with the normal periodic light transmission function of the interferometer to constrain operation of the interferometer to the narrow spectral range defined by this additional filter. The light reflected from, or transmitted by, the sensor/filter combinations is then fed to a balancing interferometer which substantially compensates for the path imbalance in the sensor interferometer and can also incorporate a phase or frequency modulating element in one of its light paths to allow heterodyne signal processing of the sensor output. The light output of this receiving interferometer is then fed into a spectrometer to separate light substantially lying within each narrow spectral band, corresponding to each sensor in the array, before directing it onto an optical detector array. Each of the signals from each element of this detector array may then be processed, for example by phase or frequency demodulation of the detected heterodyne signal, to recover an electronic analogue of the acoustic signal affecting the acoustic sensor equipped with the filter of wavelength corresponding to that channel in the receiver spectrometer.

This invention makes use of a number of well-established techniques such as wavelength division multiplexing, sensing array networks, heterodyne detection, matched interferometers, and wavelength demultiplexing onto parallel detector arrays. It is the combination of these state-of-the-art techniques to provide the only-known practical solution to the demanding problem of simultaneous acquisition of high-bandwidth information in very-long arrays containing large numbers of sensor elements which is the novel aspect of this invention.

Accordingly the present invention, provides apparatus for the measurement of one or more physical parameters, comprising source means for providing a source of electromagnetic radiation, sensing network means which comprises a plurality of sensing interferometer means each of which includes a wavelength filter means for selecting a band of wavelengths of electromagnetic radiation provided by the source means and is suitable for converting the magnitude of one or more physical parameters to a change in a sensor optical path length delay; a reference interferometer means for selecting a reference optical path delay; modulation means which is for one or more paths of the reference interferometer means to provide means for electronically processing a resulting interfered signal to high accuracy; a wavelength selection means for selecting one or more of the band of wavelengths filtered by one or more of the sensing interferometer means; detection means for converting the electromagnetic radiation selected by the wavelength selection means to an electrical signal.

It is desirable that the apparatus is such that the optical path delay of the sensing interferometer means is greater than the coherence length of the source means, the coherence length of the electromagnetic radiation selected by each of the wavelength filter means, and the coherence length of the electromagnetic radiation selected by the wavelength selection means.

The source means may be one or more broad band light emitting diodes coupled together using a wavelength division multiplexing couplers to from a very broadband spectrum which may be shaped and amplified by an optical amplifier to improve the signal to noise ratio or to increase the range of the sensor network means.

The source means may be an optical fibre source such as a superfluorescent optical fibre source which may be followed by an optical fibre amplifier.

The sensing network means may comprise many sensing interferometer means which work in reflection or in transmission or a combination of reflection and transmission.

The sensing network means may include one or more optical fibre amplifiers for amplifying or adjusting the relative power distribution of optical signals.

The wavelength filter means may be a wavelength selective grating inside an optical fibre waveguide, or may be a wavelength selective optical fibre coupler, or may be an integrated optic grating device.

The sensing interferometer means may comprise a pair of wavelength filter means which may be optical fibre gratings having similar wavelength responses separated by a short length of fibre which is sensitised to the measurand.

The reference interferometer means may be an interferometer in a Mach Zehnder configuration, or may be an interferometer in a Michelson configuration. The reference interferometer may also be constructed partly or entirely such that the electromagnetic radiation is confined within optical fibre. In addition a frequency shifter such as an acoustic optic modulator or a fibre optic frequency shifter may be put in one or more paths of the reference interferometer means to provide a means for heterodyne detection or alternatively, a phase modulator, such as an electro-optic modulator or a fibre wound around a piezo-electric transducer, may be used in one or more paths in the reference interferometer means to provide a means for synthetic heterodyne detection.

The sensing interferometer means may be arranged in an order which optimises the signal to noise ratio of the system.

The wavelength selection means may be an optical spectrum analyser, a monochromator, an optical filter wheel, an optical grating, or one or more optical fibre gratings matched to the wavelength range of the wavelength filter means and may be connected in series with an optical fibre coupler to direct each selected wavelength range to a detector.

The detection means may be a linescan camera or may be an array of discrete detectors.

In an embodiment of the present invention, the apparatus is one in which the electromagnetic radiation utilised in the apparatus is conveyed between one or more of the different components of the apparatus by one or more optical fibre waveguides.

In an embodiment of the present invention, the apparatus is one in which there is provided a sensing network means of interconnected optical fibre sensing interferometer means, each sensing interferometer means having a multiplicity of optical paths with one or more delays dependant on the physical quantities to be measured, in which a broadband light source is used to illuminate said sensing network means of said sensing interferometer means and in which each said sensing interferometer means contains an additional wavelength filter means to select a narrow spectrum band of optical energy from the overall light spectrum of energy emitted from the said light source means, each wavelength filter means covering a different narrow spectral band, for each sensing interferometer means in the said sensing network means, and where the light transmitted by, or reflected from, each sensing interferometer means in the said sensing network means is then transmitted to a receiving system where said receiving system comprises a reference interferometer means which has a multiplicity of optical paths and where the difference between at least two of these paths corresponding to one or more of the optical path differences in the sensing interferometer means and where then the light passing through the optical paths is then passed to a wavelength selective means to direct light substantially to each of the said narrow spectral bands to separate photodetector means, dependant on the wavelength of the said spectral band, such that detector means output signal responds to changes in optical path delay in the sensing interferometer means associated with the wavelength filter means of corresponding spectral transmission band, and where, if desired, the reference interferometer means may contain optical phase or frequency modulation means in one or more of the optical paths in order to provide a periodic modulation signal on the optical detectors to facilitate electronic signal processing of the detected intensity to recover the information on path length changes in the sensing interferometer means.

The electronic signal processing may be based upon frequency modulation (FM) demodulation techniques such as phase-locked loops.

The reference interferometer means may be located at the output of the source means.

In a further embodiment of the present invention, the apparatus is such that the source means and wavelength selection means are combined as a wavelength scanning source. The wavelength scanning source may be a scanning optical fibre source or a scanning semiconductor laser diode array utilising integrated optic devices.

Embodiments of the invention will now be described solely by way of example and with reference to the accompanying drawings in which.

Figure 10:
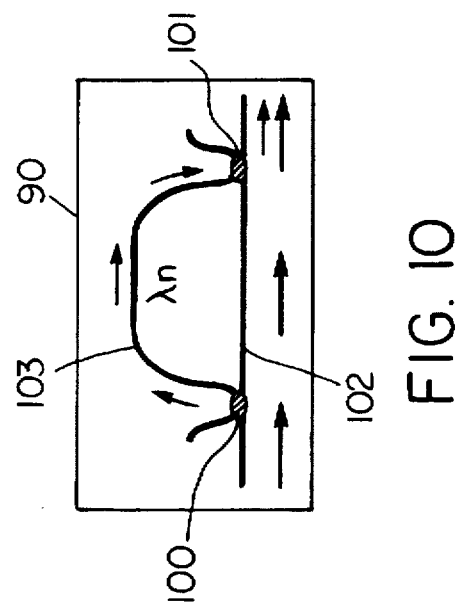
Figure 11:
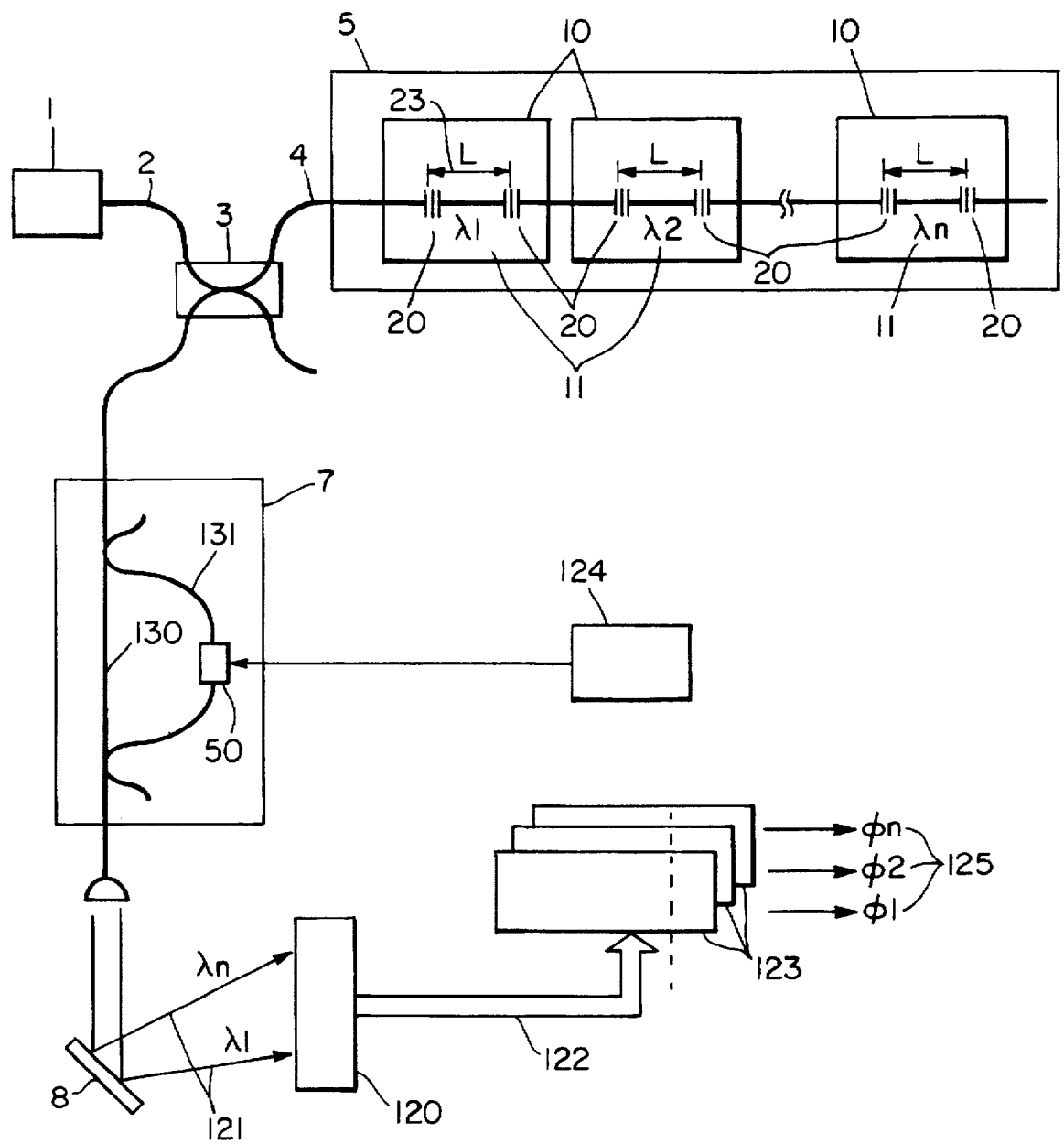

FIG. 10 is a diagram of an embodiment of the sensing interferometer means suitable for use in sensing network means when used in transmission; and FIG. 11 is a diagram of a preferred embodiment of the present invention which comprises of a broad band source means, a sensing network means of interconnected pairs of optical fibre gratings along a length fibre, a Mach-Zehnder reference interferometer, an optical grating, a detector array and a demodulator means.

Figure 1:
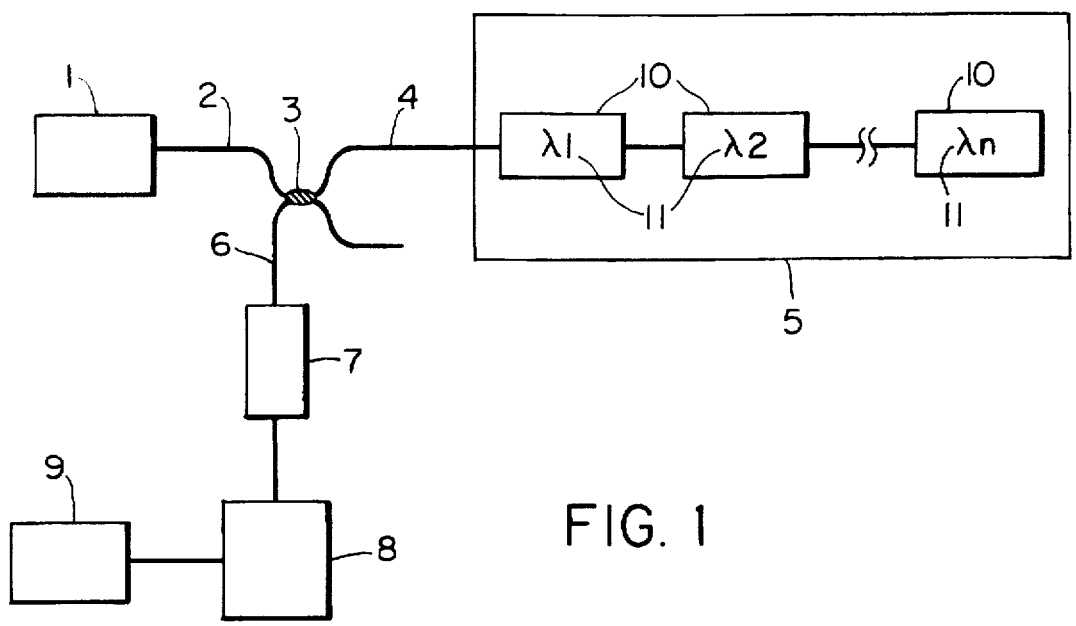
FIG. 1 is a diagram of an embodiment of the present invention, in which optical fibres are used and the sensing network means is used in reflection.

An embodiment of the present invention, in which optical fibre waveguides are used and the sensing network means is used in reflection, is shown in FIG. 1. A source means I provides a broad band source of electromagnetic radiation which is conveyed by optical fibre 2 to optical fibre coupler 3, into optical fibre cable 4 and then into sensing network means 5. A proportion of the electromagnetic radiation is reflected back by the sensing network means 5, having been affected by the environmental parameters to which the sensing network means 5 is sensitive. This reflected electromagnetic radiation returns along the optical fibre cable 4, into the optical fibre coupler 3, and a proportion then enters optical fibre 6. This proportion passes through reference interferometer means 7, wavelength selective means 8 so that a reference wavelength range of electromagnetic radiation falls on detection means 9. The sensing network means 5 contains a plurality of sensing interferometer means 10, each of which has a specified sensor wavelength range 11. In use, the wavelength selection means 8 may be adjusted to separate the specified sensor wavelength range 11 such that the coherence of the selected light is shorter than the sensor optical path delay. A reference optical path delay may be selected by the reference interferometer means 7 to match a sensor optical path delay of the sensing interferometer means 10. The sensor optical path delay may be measured by detecting an interference pattern signal with the detection means 9.

Figure 2:
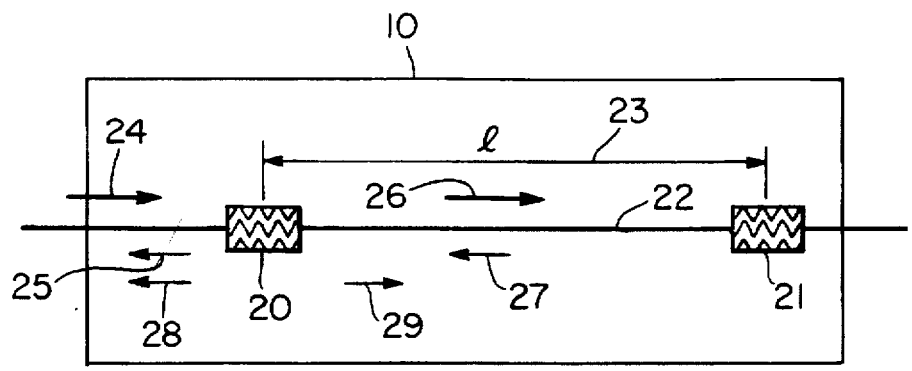
FIG. 2 is a diagram of an embodiment of the sensing interferometer means.

FIG. 2 is a diagram of an embodiment of the sensing interferometer means 10 constructed using optical fibre, in which wavelength filter means comprises a first in-line grating 20 and a second in-line grating 21 inside an optical fibre 22 separated by a specified distance 23 which constitutes a sensor optical path delay. Incident electromagnetic radiation 24 is incident on the first in-line grating 20 and a first reflected part 25 is reflected by the first in-line grating 20 and a first transmitted part 26 is incident upon the second in-line grating 21. Similarly, a second reflected part 27 is reflected from the second in-line grating 21 and returns back along the optical fibre 22 and a second transmitted part 28 is transmitted through the first in-line grating 20. The first in-line grating 20 and the second in-line grating 21 select a sensor wavelength range such that the selected light has a coherence shorter than the sensor optical path delay determined by the optical length of the optical fibre 22. Therefore, the first reflected part 25 and the second transmitted part 28 cannot interfere coherently.

Figure 3:
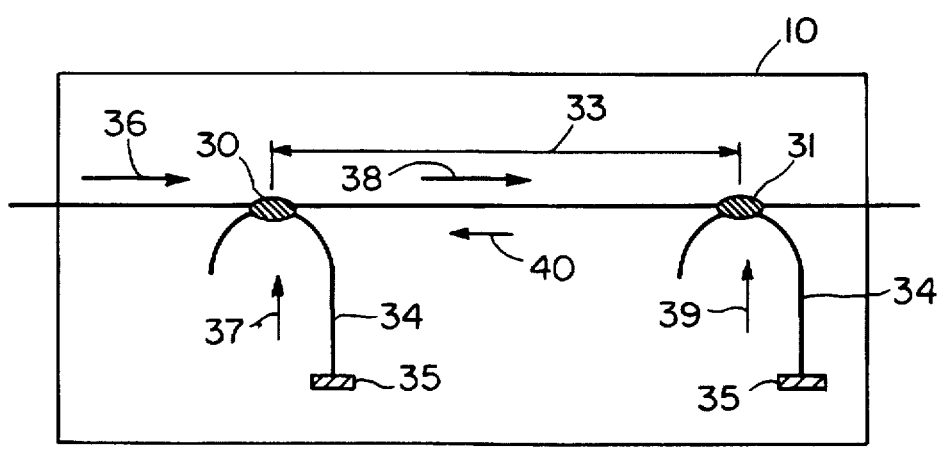
FIG. 3 is a diagram of an embodiment of the sensing interferometer means using wavelength selective couplers.

FIG. 3 is a diagram of an embodiment of the sensing interferometer means 10 constructed using optical fibre, in which wavelength filter means comprises a first wavelength selective coupler 30 and a second wavelength selective coupler 31 linked by an optical fibre 32 separated by a specified distance 33. An arm 34 of the first wavelength selective coupler 30 and of the second wavelength selective coupler 31 are terminated in mirrors 35 so that the length 33 and the lengths of the arms 34 constitute a sensor optical path delay. Incident electromagnetic radiation 36 is incident on the first wavelength selective coupler 30 and a first reflected part 37 is reflected by the mirror 35 of the first wavelength selective coupler 30 and a first transmitted part 38 is incident upon the second wavelength selective coupler 31. Similarly, a second reflected part 39 is reflected from the mirror 35 of the second wavelength selective coupler 31 and returns back along the optical fibre 32 and a second transmitted part 40 is transmitted through the first wavelength selective coupler 30.

Figure 4:
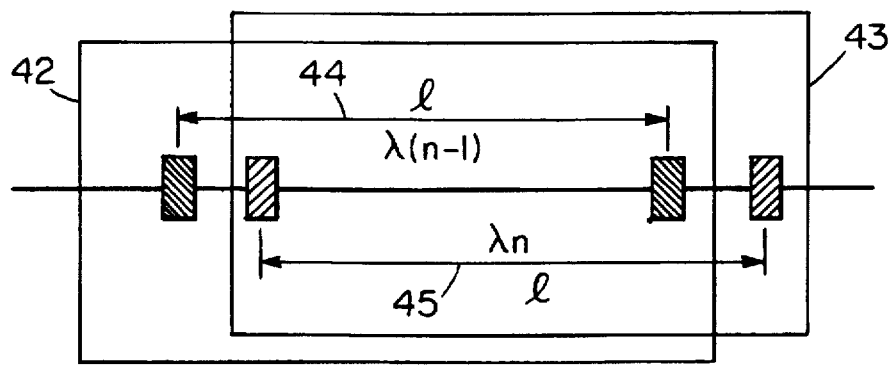
FIG. 4 is a diagram of an embodiment of part of the sensing network means in which two sensing interferometer means overlap.

FIG. 4 is a diagram of an embodiment of part of the sensing network means in which two sensing interferometer means overlap. A first sensing interferometer means 42 and a second sensing interferometer means 43 are constructed such that the separation of the first reflection from the wavelength filter means of the first sensing interferometer means 42 and the second sensing interferometer means 43 are closer together than the sensor optical path 44 of the first sensing interferometer means 42 and the sensor optical path 45 of the second sensing interferometer means 43.

Figure 5:
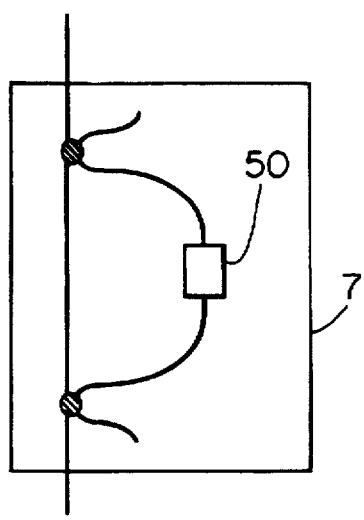
FIG. 5 is a diagram of an embodiment of the reference interferometer means taking the form of a Mach-Zehnder interferometer.

FIG. 5 is a diagram of an embodiment of the reference interferometer means 7 taking the form of a Mach-Zehnder interferometer, and which includes a modulation means 50 in one of the optical paths. The modulation means 50 may be an acoustic optic modulator device, an optical fibre frequency shifter or an integrated optic frequency shifter for heterodyne signal processing. Alternatively the modulation means may be a phase modulator such as an electro-optic device or an optical fibre attached to a piezo-electric transducer for synthetic heterodyne technique.

Figure 6:
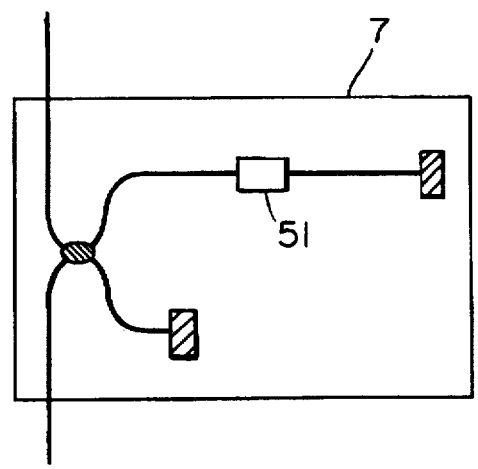
FIG. 6 is a diagram of an embodiment of the reference interferometer means taking the form of a Michelson interferometer.

FIG. 6 is a diagram of an embodiment of the reference interferometer means 7 taking the form of a Michelson interferometer, and which includes a modulation means 50 in one of the optical paths. The modulation means 50 may be an acoustic optic modulator device, an optical fibre frequency shifter or an integrated optic frequency shifter for heterodyne signal processing. Alternatively the modulation means may be a phase modulator such as an electro-optic device or an optical fibre attached to a piezo-electric transducer for synthetic heterodyne technique.

Figure 7:
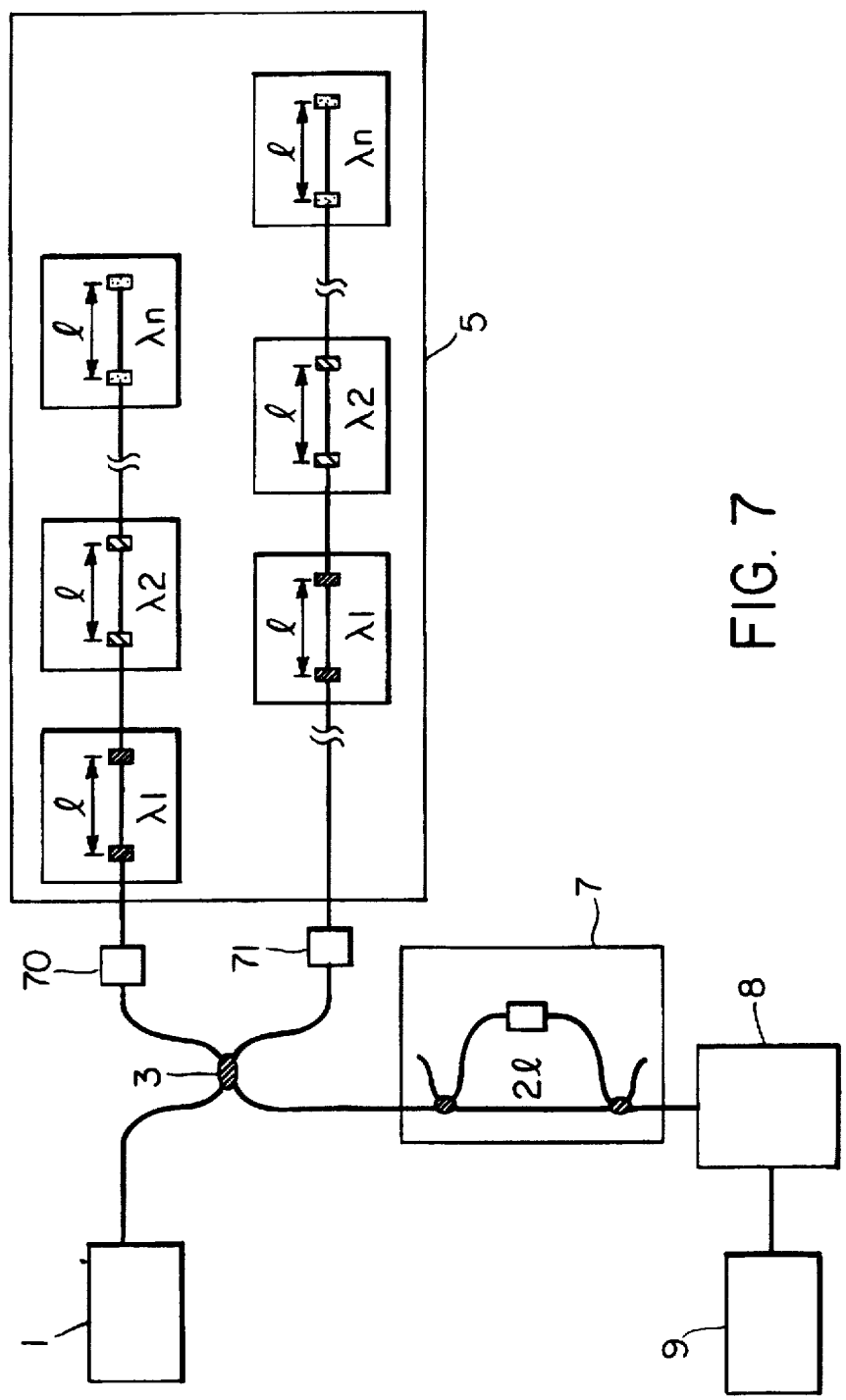
FIG. 7 is a diagram of a preferred embodiment of the present invention in which the sensing network consists of two groups of sensing interferometer means with similar sensor optical path delays and wavelength characteristics.

FIG. 7 is a diagram of a preferred embodiment of the present invention in which the sensing network means consists of two groups of sensing interferometer means with similar sensor optical path delays and wavelength characteristics. The electromagnetic radiation received from two separate groups of sensing interferometer means may be separated by using a first modulator means 70 and a second modulator means 71.

Figure 8:
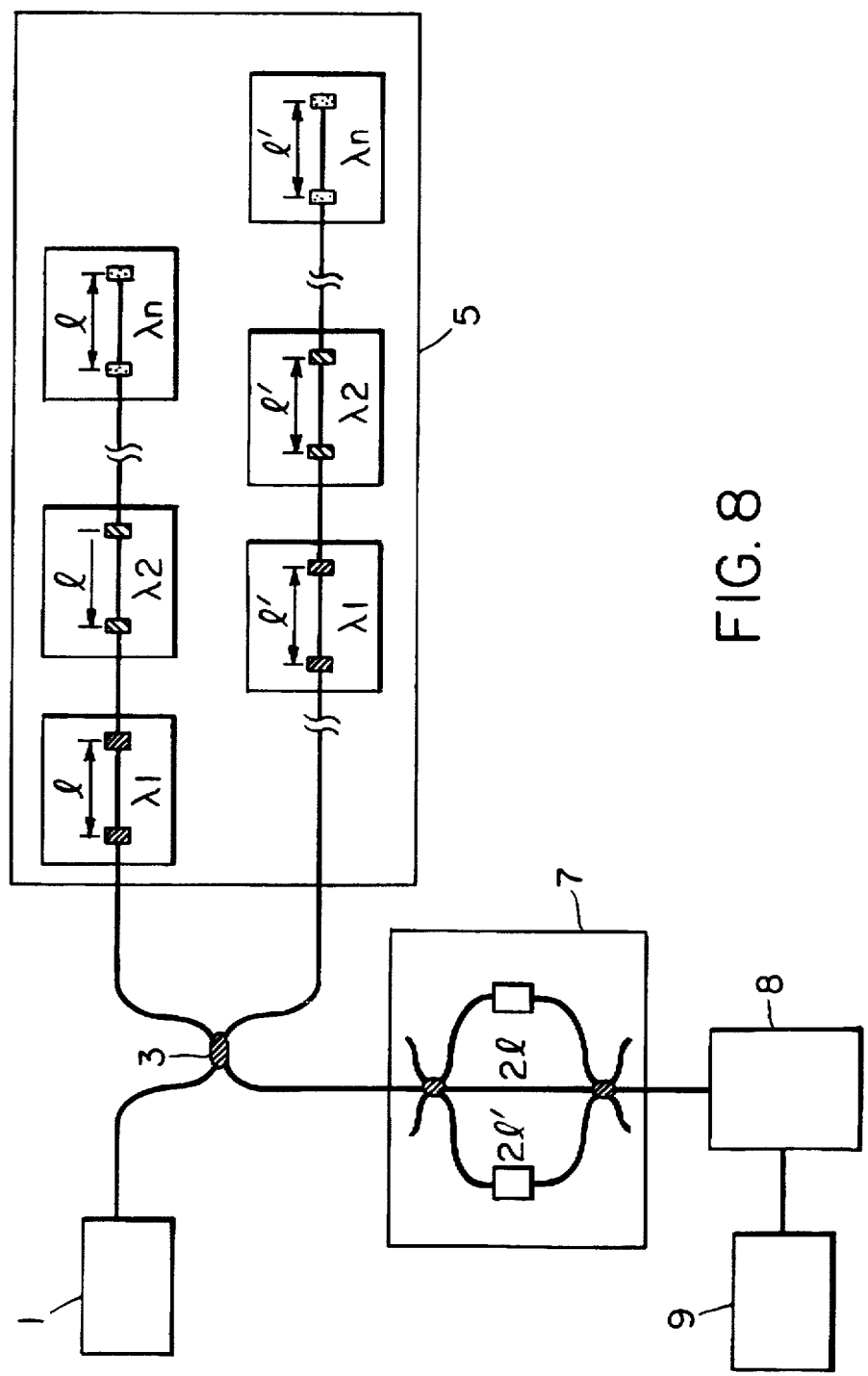
FIG. 8 is a diagram of a preferred embodiment of the present invention in which the sensing network consists of two groups of sensing interferometer means with different sensor optical path delays but similar wavelength characteristics.

FIG. 8 is a diagram of a preferred embodiment of the present invention in which the sensing network consists of two groups of sensing interferometer means with different sensor optical path delays but similar wavelength characteristics, in which reference interferometer means 7 may select two different reference optical path delays such that either one or the other of two separate groups of sensing interferometers may be selected, where each group is situated in one arm of the optical fibre coupler 3.

Figure 9:
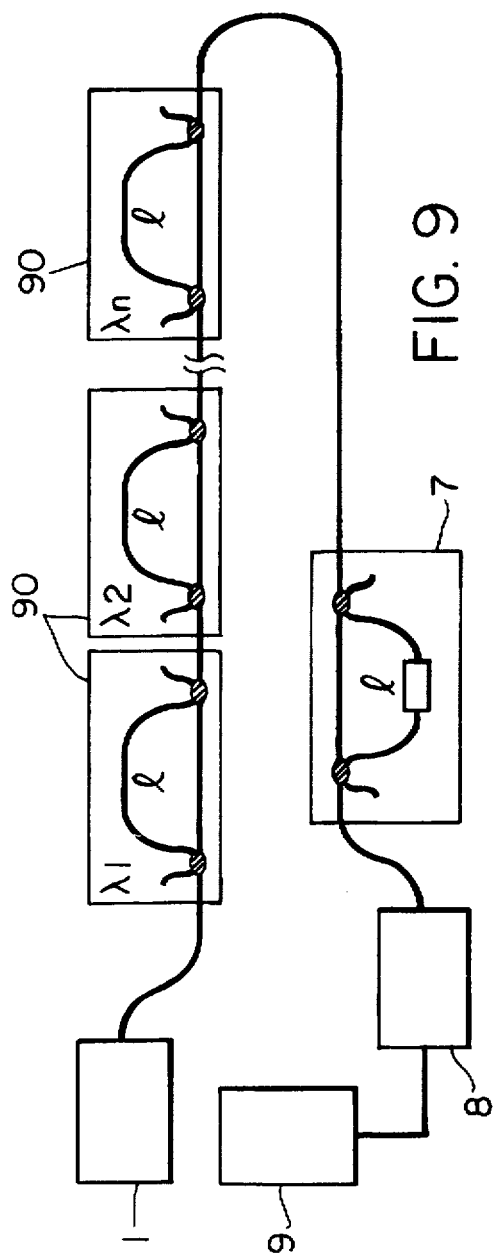
FIG. 9 is a diagram of an embodiment of the present invention, in which optical fibres are used and the sensing network means is used in transmission.

FIG. 9 is a diagram of an embodiment of the present invention, in which optical fibres are used and the sensing network means 5 is used in transmission, in which the sensing interferometer means 90 create a sensor optical path delay for electromagnetic radiation transmitted through each sensing interferometer means 90.

FIG. 10 is a diagram of an embodiment of the sensing interferometer means 90 suitable for use in sensing network means when used in transmission, in which a Mach-Zehnder configuration is used where a first sensing wavelength selective coupler 100 is joined to a second sensing wavelength selective coupler 101 by a first length of optical fibre 102 and a second length of optical fibre 103 of different lengths and thus providing a sensor optical path delay.

FIG. 11 is a diagram of a preferred embodiment of the present invention in which the output of broad band light source means 1 is conveyed by optical fibre 2 to optical fibre coupler 3, in to optical fibre cable 4 and then in to sensing network means 5. The sensing network means 5 comprises of sensing interferometer means 10 which are constructed using pairs of in-line fibre gratings 20 separated by a length of optical fibre 23 and such that the length of fibre between the grating pairs 20 are made similar. The optical path delay in the sensing interferometer means 10 is determined by the time taken for the light to transverse the length of the optical fibre between the grating pairs 20. Each pair of in-line fibre gratings 20 select and reflect a distinguished band of wavelengths 11 emitted by the source means 1 such that the coherence of the selected light is much shorter than the optical path delay of the sensing interferometer means 10 and, therefore, the reflected optical signals are not coherent. The reflected light is transmitted to a reference interferometer means 7 where it is split in to two paths 130 and 131 which differ by a similar optical path delay of the sensing interferometer means 10. At the output of the reference interferometer means 7, the light signals are combined and a portion of consecutive reflected light signals which experience similar optical path delay interfere coherently with each other. For example, a portion of the first reflected light passed through the long path 131 of the reference interferometer means 7 interfere coherently with the portion of the subsequent reflected light passed through the short path 130 of the reference interferometer means 7. It is preferred to incorporate a modulation means 50, which may be a frequency shifter, in one of the paths of the reference interferometer for heterodyne detection where a carrier frequency is supplied by an oscillator source means 124. Alternatively, the modulation means 50 may an optical phase modulator to provide a means for synthetic heterodyne detection. At the output of the reference interferometer means 7, the band of wavelengths reflected 11 by each sensing interferometer means 10 are separated by a dispersive element 8 such as an optical grating and then imaged on to a photo-detector array 120 which converts the optical signals 121 in to electrical signals 122. The output of each photo-detector element 122 is fed to separate demodulators 123, which for frequency modulation detection may be phase-locked loops, to recover simultaneously the relative optical phase 125 induced in each sensing interferometer means 10.

It is to be appreciated that the embodiments of the invention described above with reference to the accompanying drawings have been given by way of example only and that modifications and additional components may be provided to enhance the performance of the apparatus.

I claim:

1. Apparatus for the measurement of one or more physical parameters, which apparatus comprises:

source means for providing a source of electromagnetic radiation;

sensing network means which comprises a plurality of sensing interferometer means each of which includes a wavelength filter means for selecting a band of wavelengths of electromagnetic radiation provided by the source means and is suitable for converting the magnitude of one or more physical parameters to a change in sensor optical path length delay;

a reference interferometer means for selecting a reference optical path delay;

modulation means which is for modulating one or more paths of the reference interferometer means to provide means for electronically processing a resulting interfered signal to high accuracy;

a wavelength selection means for simultaneously selecting the bands of wavelengths filtered by a plurality of the sensing interferometer means; and detection means containing more than one detector for simultaneously converting the electromagnetic radiation selected by the wavelength selection means to a plurality of electrical signals; and the apparatus being such that:

the optical path delay of the sensing interferometer means is greater than the coherence length of the source means, the coherence length of the electromagnetic radiation selected by each of the wavelength filter means, and the coherence length of the electromagnetic radiation selected by the wavelength selection means;

the reference optical path delay of the reference interferometer means is equal to the optical path delay of the respective sensing interferometer means to approximately within the coherence length of the electromagnetic radiation selected by the respective wavelength filter means in order to achieve coherent interference from the respective sensing interferometer means;

the source is sufficiently broadband that the spectrum illuminates more than one of the sensing interferometer means simultaneously;

the wavelength filter means in each sensing interferometer means being interrogated simultaneously are non-overlapping spectrally;

the returned light from the sensing interferometer means being illuminated are simultaneously modulated by the modulation means; and the wavelength selection means directs the returned light from each sensor interferometer means being illuminated to a separate detector in the detection means in order that the apparatus may be used to provide simultaneous acquisition of high-bandwidth information from multiple sensing interferometer means.

2. Apparatus according to claim 1 in which the source means is at least one broad band light emitting diode.

3. Apparatus according to claim 1 in which the source means is an optical fibre source which is followed by an optical fibre amplifier.

4. Apparatus according to claim 1 in which the reference interferometer means contains optical phase or frequency modulation means in one or more of the optical paths in order to provide a periodic modulation signal on the optical detectors to facilitate electronic signal processing of the detected intensity to recover the information on path length changes in the sensing interferometer means.

5. Apparatus according to claim 1 in which the sensing network means includes at least one optical fibre amplifier for amplifying or adjusting the relative power distribution of optical signals.

6. Apparatus according to claim 1 in which the wavelength filter means is a wavelength selective grating inside an optical fibre waveguide, a wavelength selective optical fibre coupler, or an integrated optic grating device.

7. Apparatus according to claim 1 and including a pair of wavelength filter means.

8. Apparatus according to claim 1 in which the modulation means is a frequency shifter in said one or more paths of the reference interferometer means to provide a means for heterodyne detection.

9. Apparatus according to claim 1 in which the modulation means is a phase modulator in said one or more paths of the reference interferometer means to provide a means for synthetic heterodyne detection.

* * * * *